(12) United States Patent
Okawa

(10) Patent No.: US 9,948,932 B2
(45) Date of Patent: Apr. 17, 2018

(54) IMAGE PROCESSING APPARATUS AND CONTROL METHOD OF IMAGE PROCESSING APPARATUS

(71) Applicant: CANON KABUSHIKI KAISHA, Tokyo (JP)

(72) Inventor: Koji Okawa, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 214 days.

(21) Appl. No.: 14/720,575

(22) Filed: May 22, 2015

(65) Prior Publication Data

US 2015/0341639 A1 Nov. 26, 2015

(30) Foreign Application Priority Data

May 26, 2014 (JP) .................. 2014-108552

(51) Int. Cl.
| | |
|---|---|
| *H04N 19/55* | (2014.01) |
| *H04N 19/21* | (2014.01) |
| *H04N 19/176* | (2014.01) |
| *H04N 19/105* | (2014.01) |
| *H04N 19/513* | (2014.01) |
| *H04N 19/124* | (2014.01) |
| *H04N 19/517* | (2014.01) |
| *H04N 19/159* | (2014.01) |
| *H04N 19/139* | (2014.01) |
| *H04N 19/14* | (2014.01) |

(52) U.S. Cl.
CPC ......... *H04N 19/124* (2014.11); *H04N 19/105* (2014.11); *H04N 19/139* (2014.11); *H04N 19/14* (2014.11); *H04N 19/159* (2014.11); *H04N 19/176* (2014.11); *H04N 19/21* (2014.11); *H04N 19/513* (2014.11); *H04N 19/517* (2014.11); *H04N 19/55* (2014.11)

(58) Field of Classification Search
None
See application file for complete search history.

(56) References Cited

U.S. PATENT DOCUMENTS

| | | | | |
|---|---|---|---|---|
| 2009/0123066 | A1* | 5/2009 | Moriya | H04N 19/139 382/166 |
| 2012/0140814 | A1* | 6/2012 | Sole Rojals | H03M 7/4018 375/240.02 |
| 2012/0230417 | A1* | 9/2012 | Sole Rojals | H04N 19/00109 375/240.18 |

(Continued)

FOREIGN PATENT DOCUMENTS

| | | | | |
|---|---|---|---|---|
| JP | 05-049017 | A | 2/1993 | |
| JP | 05049017 | * | 2/1993 | ............... H04N 7/13 |

(Continued)

*Primary Examiner* — Reza Aghevli
(74) *Attorney, Agent, or Firm* — Canon USA, Inc. I.P. Division

(57) ABSTRACT

A variable-length encoding unit in an image processing apparatus encodes a frame constituting a moving image, and a selection unit determines whether to employ a reference vector calculated from a motion vector corresponding to a block other than a first block among a plurality of blocks in a second frame subsequent to a first frame constituting the moving image as the motion vector corresponding to the first block, based on an encoding result of the first frame.

23 Claims, 12 Drawing Sheets

(56) References Cited

U.S. PATENT DOCUMENTS

| | | | |
|---|---|---|---|
| 2012/0250773 A1* | 10/2012 | Chien | H04N 19/103 375/240.26 |
| 2013/0064294 A1* | 3/2013 | Sole Rojals | H04N 19/176 375/240.12 |
| 2014/0314141 A1* | 10/2014 | Choi | H04N 19/463 375/240.02 |
| 2014/0369415 A1* | 12/2014 | Naing | H04N 19/159 375/240.16 |
| 2014/0376634 A1* | 12/2014 | Guo | H04N 19/52 375/240.16 |
| 2015/0016512 A1* | 1/2015 | Pu | H04N 19/176 375/240.03 |
| 2015/0195559 A1* | 7/2015 | Chen | H04N 19/11 375/240.16 |
| 2015/0264348 A1* | 9/2015 | Zou | H04N 19/593 375/240.02 |
| 2015/0264386 A1* | 9/2015 | Pang | H04N 19/513 375/240.16 |

FOREIGN PATENT DOCUMENTS

| | | |
|---|---|---|
| WO | 2007/105590 A1 | 9/2007 |
| WO | 2012/121234 A1 | 9/2012 |

* cited by examiner

IMAGE PROCESSING APPARATUS AND CONTROL METHOD OF IMAGE PROCESSING APPARATUS

BACKGROUND OF THE INVENTION

Field of the Invention

The present invention relates to an image processing apparatus which encodes a moving image and an encoding method.

Description of the Related Art

Encoding methods such as H.264 and High Efficiency Video Coding (HEVC) recommended by International Telecommunication Union Telecommunication Standardization. Sector (ITU-T) divide one frame of the moving image into a plurality of blocks and perform encoding in block units. Compression encoding methods include an encoding method using temporal correlation (i.e., an inter-encoding) and an encoding method using spatial correlation (i.e., an intra-encoding). The encoding method using the temporal correlation employs a previously encoded image as a reference image and searches for a motion vector between the block in the reference image and the block in the image to be encoded. A prediction residual between the corresponding blocks is then encoded. The encoding method using spatial correlation performs prediction from pixels in the blocks surrounding the block to be encoded, and encodes the prediction residual of the block.

Data which has been encoded in block units mainly includes the motion vector of the block, a header component such as an encoding type of the block, and a prediction residual component, i.e., a difference between pixel values of the predictive image and the image to be encoded.

It is effective to use a skip block in H.264 (or a skip mode in HEVC) to reduce a data amount of the header component. When using the skip block, the header component and the residue component are not included in the block, so that encoding can be performed for a small data amount (i.e., if the skip block is executed in H.264, encoding can be performed by a data amount of 1 bit or less per block). If a block is to be encoded using the skip block in H.264, it is necessary to align the motion vector with the motion vectors of the surrounding blocks.

Further, if full search is performed for obtaining the motion vector, the following is performed. For example, if the block of 16×16 pixels is compared with a search area of all 64×64 pixels of the reference frame, it is necessary to perform an 8-bit comparison operation 1048576 times (i.e., 16×16×64×64=1048576). A calculation cost thus becomes huge.

Japanese Patent Application Laid-Open No. 5-49017 discusses reducing the calculation cost in obtaining the motion vector by performing a motion search method using a binary image. If the binary image is employed as an input image, the calculation cost per pixel can be reduced.

However, there are cases where the skip block cannot be used depending on a search result of the motion vector. When the skip block is performed, it is necessary to align the motion vector of the block to be processed and the motion vectors of the surrounding blocks. For example, if the motion vector search is performed using the binary image, the motion vectors may not be easily aligned. Therefore, there are cases where the skip block cannot be performed when the motion vector search is executed using the binary image while the skip block can be performed when the motion vector search is executed by directly using the input image.

The motion vector search using the binary image will be described below with reference to FIG. 2. Referring to FIG. 2, there is a current frame multi-value image 201 (i.e., the input image) and a reference frame multi-value image 202 (e.g., the input image one frame before). A current frame binary image 203 is the image obtained by binarizing the current frame multi-value image 201 and a reference frame binary image 204 is the image obtained by binarizing the reference frame multi-value image 202. In the figure, one square indicates one pixel. The pixel value of a gray area is different from the pixel value of a white area.

The current frame multi-value image 201 and the reference frame multi-value image 202 includes the gray area. However, since the difference between the pixel values of the gray area and the white area is small, there is no change in the pixel values of the current frame binary image 203 and the reference frame binary image 204. The current frame multi-value image 201 and the reference frame multi-value image 202 are images in which the change in the pixel values in the images are small, so that there is no change in the pixels when the current frame multi-value image 201 and the reference frame multi-value image 202 are binarized.

The case where 2×2 pixels illustrated in FIG. 2 is one block and the search area of 6×6 pixels is to be searched will be considered for ease of description. A block 205 of 2×2 pixels bordered by a thick line in the current frame multi-value image 201 is the block to be processed, and the full search is performed on the reference frame multi-value image 202. In such a case, a block 206 bordered by the thick line in the reference frame multi-value image 202 matches the block 205. On the other hand, if the full search is performed on the reference frame binary image 204 using a block 207 as a target block in the current frame binary image 203 in which a position corresponds to the block 205, a block 208 bordered by the thick line in the reference frame binary image 204 matches the block 207.

As described above, the search results of the motion vector using the multi-value image and the binary image may be different in a flat image (i.e., an image in which the change in the pixel values is small) or a flat area. In other words, search accuracy of the search method using the binary image is lower than the search accuracy of the search method using the multi-value image, so that there is such a difference in the search results.

In particular, if the binary image is generated from the input image and the motion vector search is performed, it becomes difficult to align the motion vectors between the surrounding blocks, so that encoding using the skip block cannot be easily executed. As a result, if conventional encoding is performed using the motion vector search method employing the binary image, encoding efficiency is likely to lower. The above-described issue is not limited to the case where the binary image is used, and a similar issue occurs when the motion vector search is performed using an N-value image obtained by lowering gradation of the input image to an N value.

SUMMARY OF THE INVENTION

According to an aspect of the present invention, an image processing apparatus includes an encoding unit configured to encode a frame constituting a moving image, and a determination unit configured to determine whether to employ a predetermined vector as a motion vector corresponding to a first block among a plurality of blocks in a second frame subsequent to a first frame constituting the moving image, based on an encoding result of the first frame.

Further features of the present invention will become apparent from the following description of exemplary embodiments with reference to the attached drawings.

DESCRIPTION OF THE EMBODIMENTS

Figure 1:
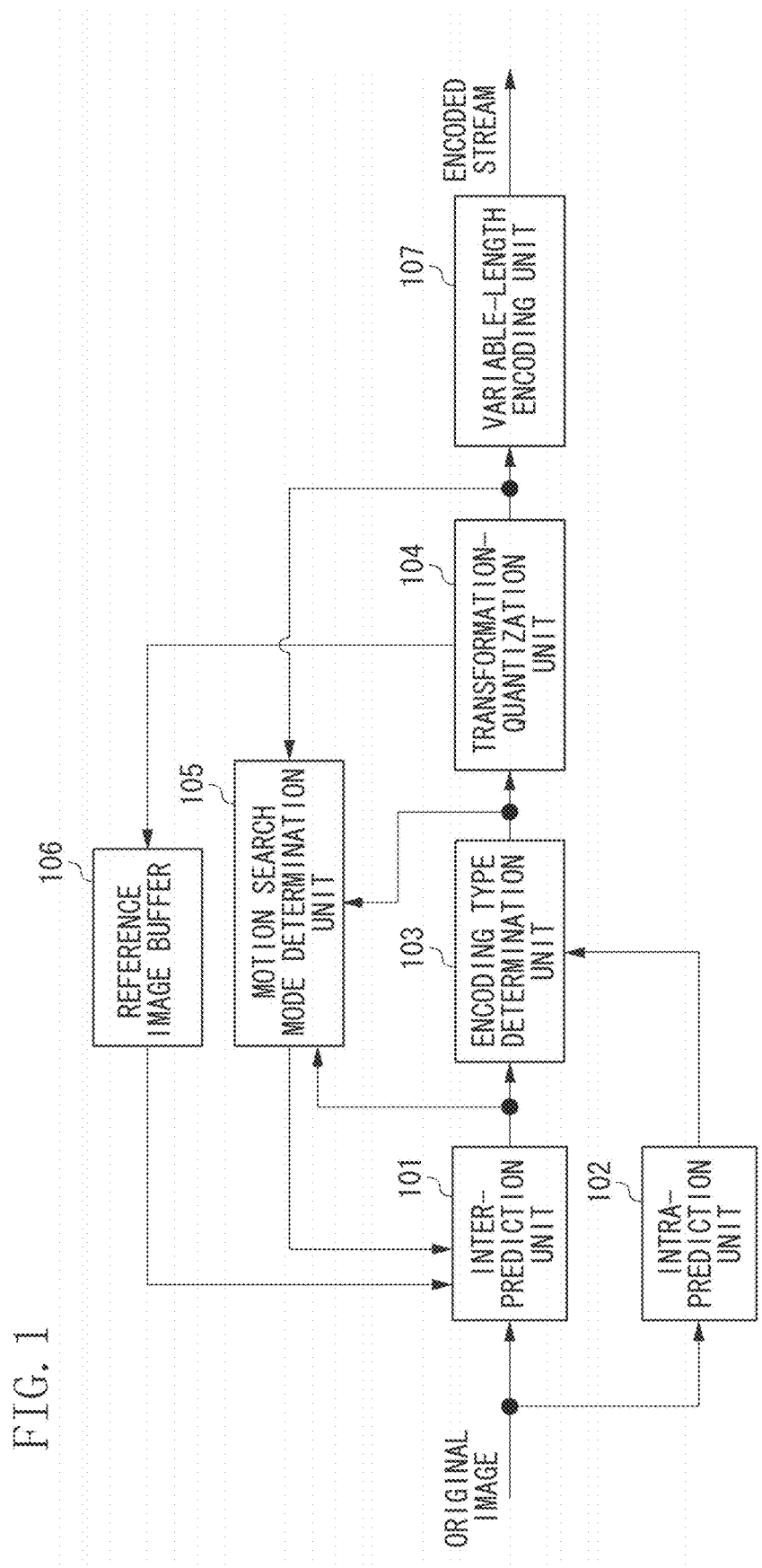
FIG. 1 is a block diagram illustrating a configuration example of an image processing apparatus according to an exemplary embodiment of the present invention.
Figure 2:
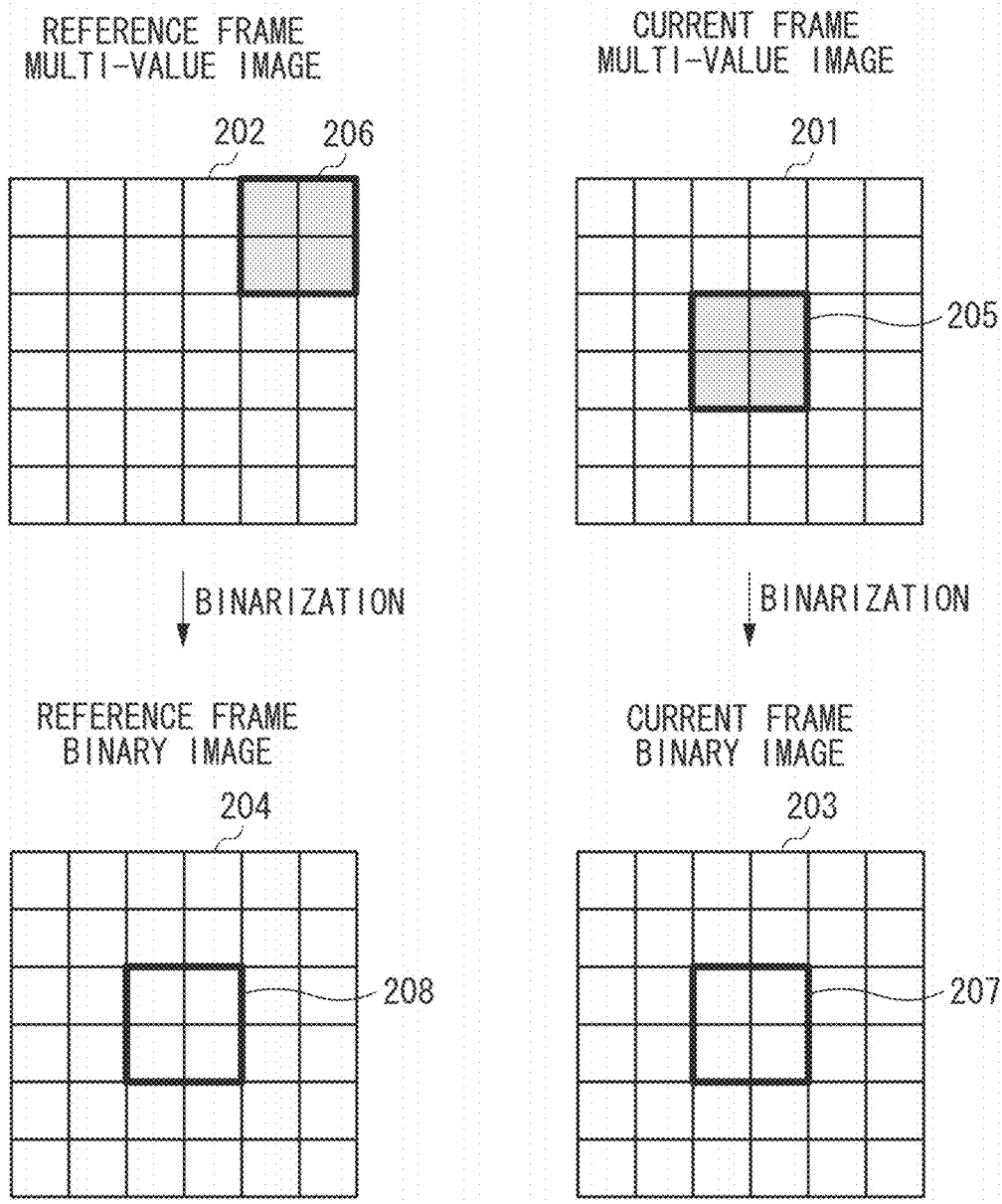
FIG. 2 is a schematic diagram illustrating a multi-value image search method and a binary image search method performed in the flat area.

A first exemplary embodiment according to the present invention will be described below with reference to the drawings. FIG. 1 is a block diagram illustrating the configuration of an encoding apparatus (i.e., the image processing apparatus) according to the present exemplary embodiment.

Referring to FIG. 1, an inter-prediction unit 101 determines the motion vector of the block to be processed based on an original image (i.e., input image) and a motion search mode (input from a motion search mode determination unit 105 to be described below). According to the present exemplary embodiment, the original image (i.e., the input image) is an image in which 1 pixel is expressed in 8 bits. However, it is not limited there to, and the original image may be a 10-bit, 12-bit, or a 4-bit image. Further, the inter-prediction unit 101 receives the reference image corresponding to the motion vector from a reference image buffer 106 to be described below. The inter-prediction unit 101 then generates an inter-prediction error (i.e., difference data) which is the error between the original image and the reference image. The inter-prediction unit 101 will be described in detail below.

An intra-prediction unit 102 obtains the original image, performs prediction based on the pixels surrounding the block to be processed, and generates an intra-prediction error. More specifically, the intra-prediction unit 102 generates a predictive image from the pixel values surrounding the process target block in the original image (i.e., the input image). The intra-prediction unit 102 then generates the intra-prediction error (i.e., the difference data) which is the error between the predictive image and the original image including the process target block.

An encoding type determination unit 103 receives the motion vector and the inter-prediction error from the inter-prediction unit 101 and the intra-prediction error from the intra-prediction unit 102. The encoding type determination unit 103 then determines whether to employ intra-coding or the inter-coding for encoding the block to be processed.

A transformation-quantization unit 104 performs, based on the encoding type determined by the encoding type determination unit 103, orthogonal transformation and quantization of one of the intra-prediction error and the inter-prediction error to generate a quantization coefficient. The transformation-quantization unit 104 then performs inverse-quantization and inverse-transformation of the quantization coefficient to generate the reference image.

The motion search mode determination unit 105 receives the motion vector from the inter-prediction unit 101, the encoding type from the encoding type determination unit 103, and the quantization coefficient from the transformation-quantization unit 104 to determine the motion search mode. The motion search mode will be described in detail below. The motion search mode indicates whether to employ (use) the reference vector (i.e., the predetermined vector) as the motion vector corresponding to the block to be processed. The reference vector is calculated from the motion vectors corresponding to blocks other than the block to be processed. The predetermined vector is not limited to the motion vector calculated from the motion vectors corresponding to other blocks. For example, the predetermined vector may be a 0 vector indicating that there is no movement with respect to the block to be processed.

The reference image buffer 106 stores the reference image received from the transformation-quantization unit 104. When a subsequent frame is to be encoded, the reference image buffer 106 outputs the stored reference image to the inter-prediction unit 101.

A variable-length encoding unit 107 receives the quantization coefficient from the transformation-quantization unit 104, performs variable length encoding along with various encoding parameters, and generates an encoded stream.

Figure 3:
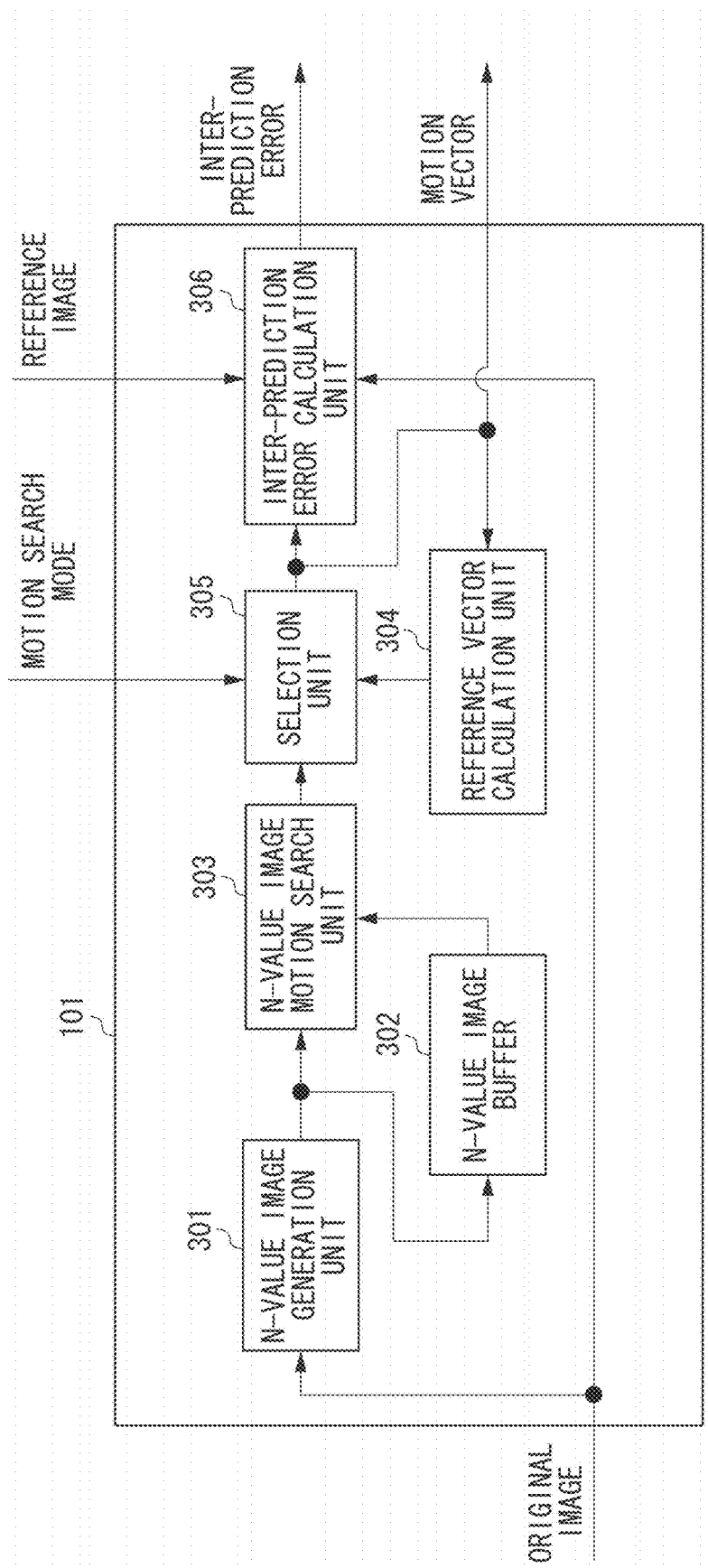
FIG. 3 is a block diagram illustrating a configuration example of an inter-prediction unit according to the exemplary embodiment.

The configuration of the inter-prediction unit 101 according to the first exemplary embodiment will be described below with reference to FIG. 3. Referring to FIG. 3, an N-value image generation unit 301 generates the N-value image from the input original image (i.e., the input image in which 1 pixel is expressed in 8 bits). In other words, the N-value image generation unit 301 lowers the gradation of the input image. According to the present exemplary embodiment, the N-value image is the binary image. However, it is not limited thereto, and the N-value image may be a 4-level image or an 8-level image. Further, it is not necessary to lower the gradation.

An N-value image buffer 302 receives and stores the N-value image from the N-value image generation unit 301. The stored N-value image is referred to, to perform the motion search when encoding the subsequent frame.

An N-value image motion search unit 303 performs the motion search based on block-matching processing using the N-value image. In other words, the N-value image motion search unit 303 searches for the motion vector based on the correlation between the pixel values of the block to be processed in the image which gradation has been lowered by the N-value image generation unit 301, and the pixel values of the other blocks. The N-value image motion search unit 303 then outputs an N-value image search vector, i.e., the motion vector obtained by the motion search using the N-value image.

A reference vector calculation unit 304 receives the motion vector from a selection unit 305 to be described below and calculates the reference vector (i.e., the predetermined vector). According to the present exemplary embodiment, the reference vector is a predicted vector (hereinafter referred to as a predicted motion vector (PMV)) calculated from the motion vectors of the blocks surrounding the block to be processed. When the block to be processed is not positioned at an edge portion of the image, the PMV is calculated by obtaining a center value, i.e., a median, of the respective motion vectors of the blocks positioned to the left, right, and upper-right sides of the block to be processed. The reference vector is not limited to the PMV and may be the 0 vector.

Figure 4:
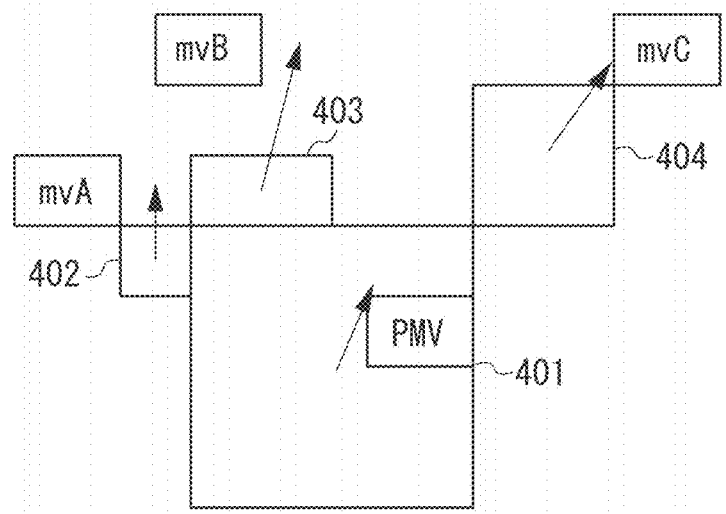
FIG. 4 is a schematic diagram illustrating a reference vector (i.e., a prediction vector).

FIG. 4 is a schematic diagram illustrating the PMV. Referring to FIG. 4, there are a block 401 to be processed, a block 402 to the left of the block to be processed, a block 403 above the block to be processed, and a block 404 to the upper-right of the block to be processed. For example, the motion vector of the block 402 in the left of the block 401 to be processed is mvA (x1, y1), the motion vector of the block 403 above the block 401 to be processed is mvB (x2, y2), and the motion vector of the block 404 to the upper-right of the block to be processed 401 is mvC (x3, y3). In such a case, PMV (x, y) of the block to be processed 401 is obtained from the following equations (1) and (2).

$$PMV(x) = \text{median}(x1, x2, x3) \quad (1)$$

$$PMV(y) = \text{median}(y1, y2, y3) \quad (2)$$

In other words, the reference vector calculation unit 304 calculates, based on the motion vectors (mvA, mvB, and mvC) of the blocks 402, 403, and 404, the reference vector. It is determined whether to employ the reference vector as the motion vector corresponding to the block to be processed (i.e., a first block). A display position of the block 402 is to the left of the block to be processed, the display position of the block 403 is above the block to be processed, and the display position of the block 404 is to the upper-right of the block to be processed.

According to the present exemplary embodiment, the reference vector is the PMV. However, the reference vector may be determined employing other methods. For example, the 0 vector may be set as the reference vector, or the vector satisfying conditions that the motion vector are not encoded as syntax, such as the skip block, may be set as the reference vector. Further, the vector included in a merge candidate list in HEVC may be set as the reference vector.

If the 0 vector is set as the reference vector, it may not satisfy the conditions that the motion vector are not encoded as the syntax. However, if the surrounding blocks are similarly determined as the 0 vectors, the number of blocks satisfying the conditions increases as a result. Further, another example of the method for calculating the reference vector is as follows. The encoding apparatus receives the result of motion recognition of an object and calculates the reference vector based on a motion amount or a motion direction of the object. In other words, the reference vector calculation unit 304 can calculate the reference vector, based on the movement of the object detected in the frame previous to the frame to be processed. A determination is made about the reference vector whether it is to be employed as the motion vector corresponding to the process target block.

The selection unit 305 receives the information indicating the motion search mode from the motion search mode determination unit 105 and selects, using the relevant information, one of the reference vector and an N-value image search vector as the motion vector corresponding to the process target block. The reference vector is the motion vector calculated from the motion vectors corresponding to the blocks other than the process target block. Further, the N-value image search vector is the motion vector searched based on the correlation between the other blocks and the process target block of the input image which gradation is lowered by the N-value image generation unit 301. The method for determining the motion search mode performed by the motion search mode determination unit 105 will be described below.

An inter-prediction error calculation unit 306 calculates the prediction error between the original image and the reference image based on the motion vector selected by the selection unit 305 and outputs the calculated prediction error as the inter-prediction error (i.e., the difference data).

The process performed by the encoding apparatus according to the present exemplary embodiment will be described in detail below with reference to the flowchart illustrated in FIG. 5. According to the present exemplary embodiment, the images configuring the moving image are input in frame units, divided into blocks, and processed in block units in a raster order. According to the present exemplary embodiment, a block size is 16×16 pixels similar to the block size in H.264. However, it is not limited thereto. For example, the block size may be 64×64 pixels, which is a maximum block size used in HEVC, or 8×8 pixels, 32×32 pixels, or asymmetric such as 32×16 pixels. According to the present exemplary embodiment, generation of H. 264-encoded stream will be mainly described as an example. However, HEVC-encoded stream may also be generated.

Figure 5:
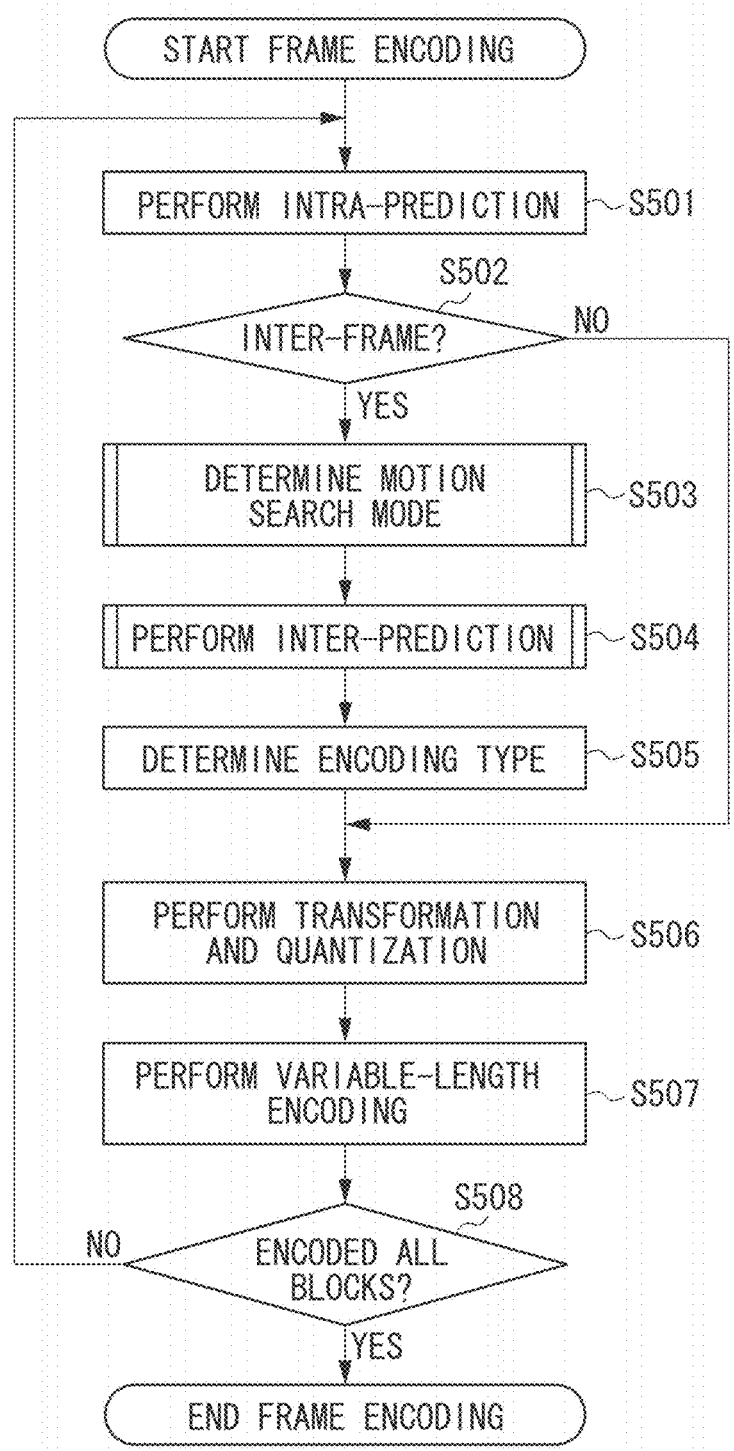
FIG. 5 is a flowchart illustrating a process performed by the image processing apparatus according to the exemplary embodiment.
Figure 12:
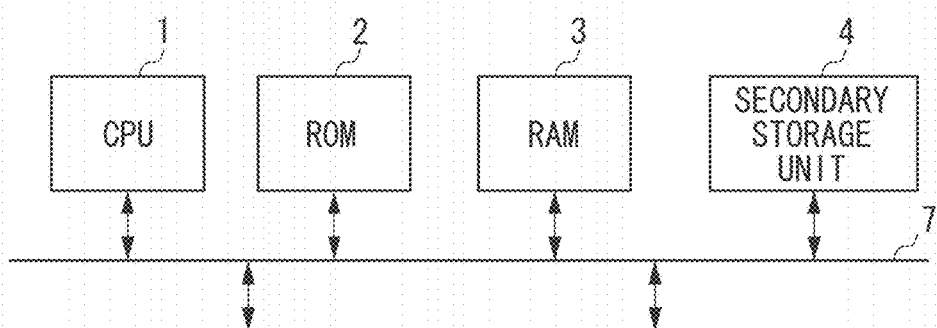
FIG. 12 illustrates an example of a hardware configuration of the image processing apparatus according to the exemplary embodiment.

The process of the flowchart illustrated in FIG. 5 is realized by a central processing unit (CPU) in the image processing apparatus reading from a memory and executing a program for performing the process illustrated in FIG. 5. Further, if the image processing apparatus according to the present exemplary embodiment is embedded in a network camera, the process illustrated in FIG. 5 is started along with the network camera starting image capturing. However, the image processing apparatus according to the present exemplary embodiment may be embedded in devices other than the network camera, such as a digital camera, a digital video camera, a personal computer, and a smartphone. Further, the process described in the flowchart according to the present exemplary embodiment may be executed using dedicated hardware. FIG. 12 illustrates an example of the hardware configuration of the image processing apparatus in the case where the process of the flowchart illustrated in FIG. 5 is performed by the CPU. Referring to FIG. 12, the image processing apparatus may include a CPU 1, a read-only memory (ROM) 2, a random access memory (RAM) 3, a secondary storage unit 4, a communication unit 5, and a video output unit 6.

In step 501 of the flowchart illustrated in FIG. 5, the intra-prediction unit 102 performs intra-prediction and generates the intra-prediction error (i.e., the difference data).

In step S502, the inter-prediction unit 101 determines whether the frame to be processed is an inter-frame or an intra-frame. The intra-frame is a frame which is encoded without referring to other frames, and the inter-frame is a frame which is encoded by referring to the other frames. If the frame to be processed is the inter-frame (YES in step S502), the process proceeds to step S503. If the frame to be processed is the intra-frame (NO in step S502), the process proceeds to step S506.

In step S503, the motion search mode determination unit 105 determines the motion search mode of the block to be processed. The motion search mode is the mode indicating whether the reference vector or the N-value image search vector is to be employed as the motion vector corresponding to the block to be processed. The search accuracy of an N-value image search method (i.e., the method for searching the motion vector using the N-value image (e.g., the binary image)) is lower in the flat area (i.e., the area in which a spatial difference between the pixel values is small). As a result, if the N-value image search vector is employed as the motion vector of the block in the flat area, it may be difficult to align the motion vectors. In other words, if the N-value image search vector is employed particularly in the flat area, the motion vectors may not become aligned even in the case where the motion vectors of the surrounding blocks would become aligned if the motion vector searched without lowering the gradation of the input image is employed. In such a case, if the reference vector is employed as the motion vector corresponding to the block in the flat area, the motion vector becomes aligned with those of the surrounding blocks, so that it becomes easier to realize the skip block.

When encoding is performed using the skip block (or the skip mode in HEVC), the encoded data can be generated which does not include the header component (e.g., the information indicating the motion vector and the information indicating the encoding type) and the residue component (i.e., the difference data) of the block. An encoding amount of the encoded data can thus be reduced.

Figure 6:
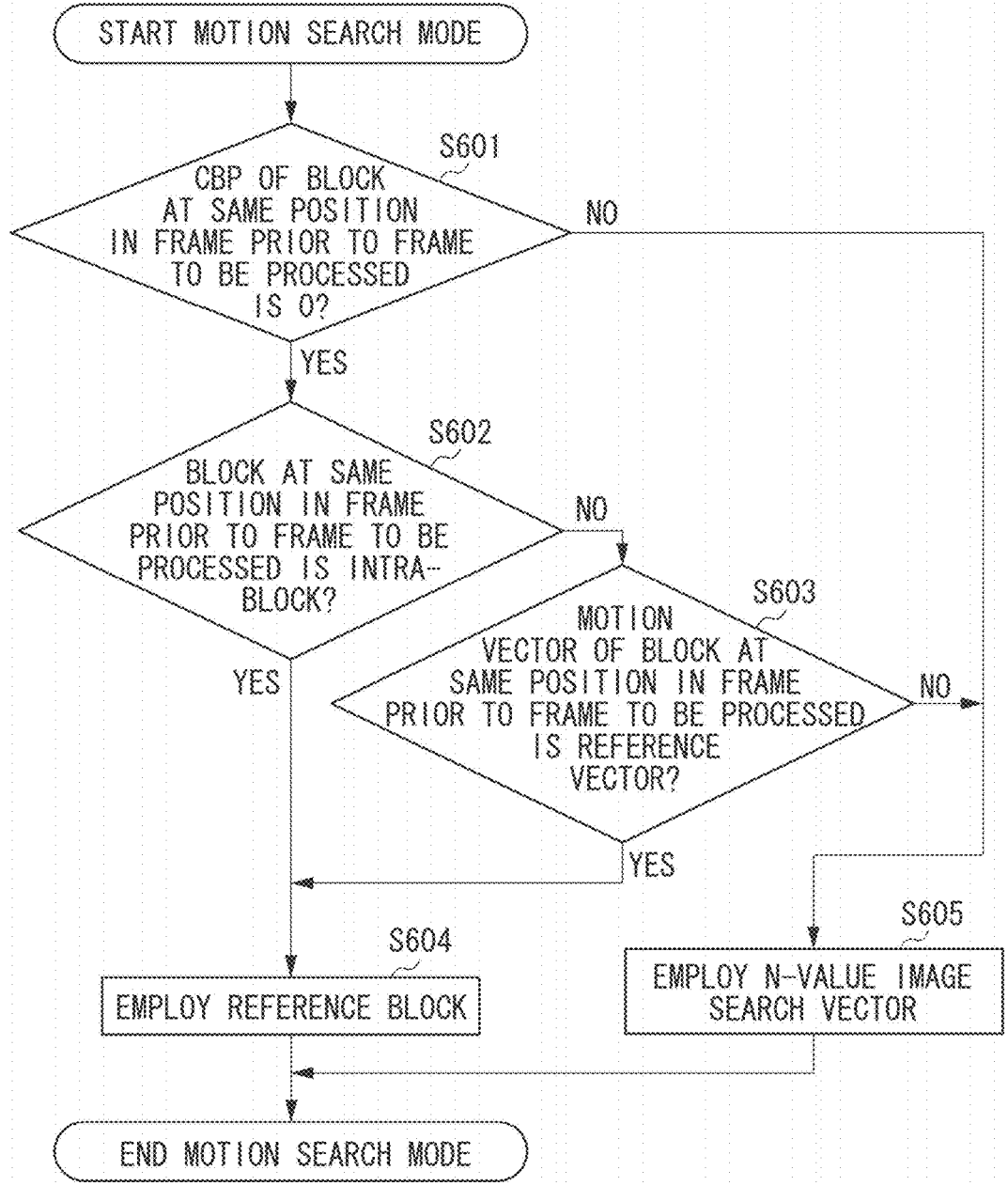
FIG. 6 is a flowchart illustrating a motion search mode determination process according to the exemplary embodiment.

The process for determining the motion search mode performed by the motion search mode determination unit 105 will be described in detail below with reference to the flowchart illustrated in FIG. 6. The process illustrated in FIG. 6 corresponds to step S503 of the flowchart illustrated in FIG. 5.

In step S601, the motion search mode determination unit 105 determines whether a coded block pattern (CBP) of the block which is at the same position as the block to be processed, (i.e., a corresponding block) is zero, among a plurality of blocks configuring the frame (i.e., a first frame) that is one frame prior to the frame to be processed (i.e., a second frame). The CBP, i.e., the coded block pattern in H.264, is the information indicating whether all quantization coefficients in the block are zero.

In other words, the motion search mode determination unit 105 identifies the corresponding block which is at the same position as the block to be processed in the process target frame, from the frame previous to the process target frame. The motion search mode determination unit 105 then determines whether the CBP of the identified corresponding block indicates that all quantization coefficients in the block are zero. The CBP may be obtained from the quantization coefficients input from the transformation-quantization unit 104. If the CBP is zero (YES in step S601), the process proceeds to step S602, and if the CBP is other than zero (NO in step S601), the process proceeds to step S605.

In step S602, the motion search mode determination unit 105 determines whether the corresponding block in the frame that is one frame prior to (i.e. a previous frame) the process target frame is the intra-block or the inter-block. In other words, the motion search mode determination unit 105 determines whether the corresponding block has been intra-encoded or inter-encoded. If the corresponding block is the intra-block (YES in step S602), the process proceeds to step S604. If the corresponding block is the inter-block (NO in step S602), the process proceeds to step S603.

In step S603, the motion search mode determination unit 105 determines whether the reference vector is employed as the motion vector of the corresponding block in the frame that is one frame prior to the process frame. If the motion search mode determination unit 105 determines that the reference vector is employed (YES in step S603), the process proceeds to step S604. If the motion search mode determination unit 105 determines that the reference vector is not employed (NO in step S604), the process proceeds to step S605.

In step S604, the motion search mode determination unit 105 determines the motion vector search mode of the block to be processed as the mode in which the reference vector is employed (i.e., a first mode). In step S605, the motion search mode determination unit 105 determines the motion vector search mode of the block to be processed as the mode in which the N-value image search vector is employed (i.e., a second mode).

In other words, the reference vector is employed as the motion vector of the block to be processed in the following case. The block among the plurality of blocks in the frame that is one frame prior to the process frame, which is at the same position as (i.e., the corresponding block of) the block to be processed, is the intra-block, and the CBP of the corresponding block is zero. More specifically, if the corresponding block is the intra-block and the CBP is zero, the corresponding block is a flat block. In such a case, the accuracy of search employing the N-value image search vector becomes lower. As a result, the reference vector is employed as the motion vector of the block to be processed.

Further, if the CBP of the corresponding block is zero, the corresponding block is the inter-block, and the motion vector of the corresponding block is the reference vector, the reference block is employed as the motion vector of the block to be processed for the following reason.

If the corresponding block is the inter-block even when the CBP is zero, it is difficult to determine whether the corresponding block is the flat block. However, if the inter-frame subsequent to the intra-frame is to be encoded, the flat block is encoded employing the reference vector according to the process of step S602. As a result, it is likely that the block in the subsequent inter-frame corresponding to the block which employs the reference vector in the current inter-frame, is also the flat block. For such a reason, according to the present exemplary embodiment, if the corresponding block is the inter-block, its CBP is zero, and the reference vector is employed as the motion vector of the corresponding block, the reference vector is employed as the motion vector corresponding to the block to be processed.

If the corresponding block is the inter-block, its CBP is zero, and the motion vector of the corresponding block is the N-value image search vector, the N-value image search vector is employed as the motion vector of the block to be processed.

Further, not only when the reference vector is employed as the motion vector of the corresponding block, but also when the N-value image search vector consequently becomes the same motion vector as the reference vector, the motion search mode determination unit 105 determines YES in step S603. As a result, if the reference vector is once not employed due to an effect of noise at the position of the block to be processed, the N-value image search vector is prevented from becoming continuously used in the subsequent inter-frame.

Furthermore, according to the present exemplary embodiment, it is determined whether the corresponding block is the flat block (i.e., the block in which the spatial change in the pixel values is small) based on the CBP. However, it is not limited thereto. For example, a coded block flag (CBF) in HEVC may be used, or the determination may be based on whether all of the quantization coefficients in the block are zero. Moreover, according to the present exemplary embodiment, it is determined in step S603 whether the reference vector is employed as the motion vector of the corresponding block. However, it is not limited thereto. For example, a determination may be made based on whether the motion vector of the corresponding block is the motion vector satisfying the conditions of the skip block or the zero vector. Further, the determination may be made based on whether the motion vector included in the merge candidate list in HEVC is employed as the motion vector of the corresponding block.

Furthermore, according to the present exemplary embodiment, it is determined, based on the encoding result of the frame that is one frame prior to (i.e., the previous frame) the frame to be processed, whether the reference vector is to be employed as the motion vector of the block to be processed. However, it is not limited thereto, and the encoding result of the frame may be used which has been encoded previous to the frame to be processed, other than the frame that is one frame prior to the frame to be processed.

Figure 7:
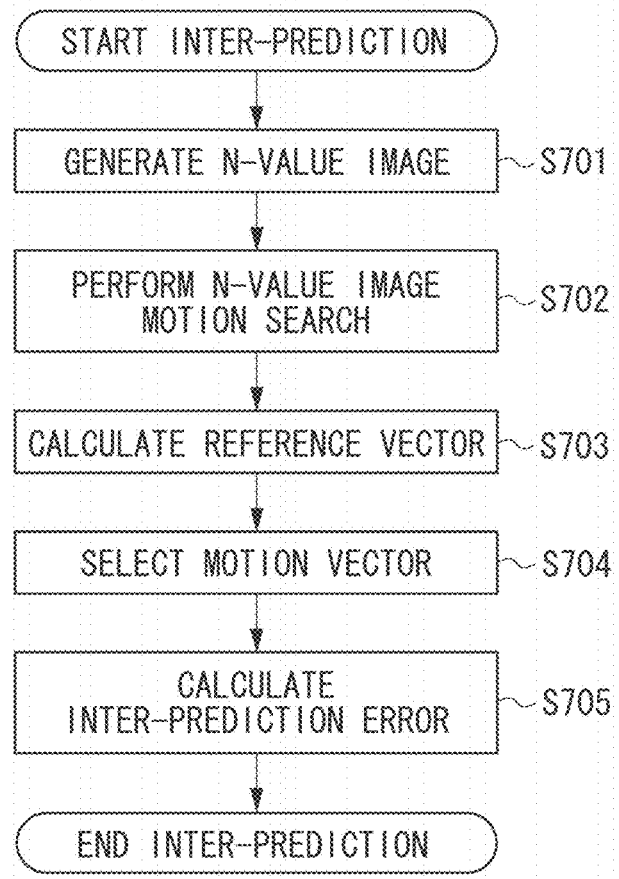
FIG. 7 is a flowchart illustrating an inter-prediction process according to the exemplary embodiment.

The inter-prediction process performed in step S504 of the flowchart illustrated in FIG. 5 will be described in detail below with reference to the flowchart illustrated in FIG. 7. The process illustrated in FIG. 7 is performed by the inter-prediction unit 101.

In step S701, the N-value image generation unit 301 generates the N-value image. In other words, the N-value image generation unit 301 lowers the gradation of the input image and generates the N-value image. The N-value image may be any image as long as it is expressed in a bit number smaller than the original image (i.e., the input image). Further, according to the present exemplary embodiment, the image processing apparatus may search for the motion vector from the original image.

In step S702, the N-value image motion search unit 303 executes the N-value image motion search. The N-value image motion search unit 303 determines a search range for searching for the motion of the block to be processed. The N-value image motion search unit 303 then reads N-value image reference data of the determined search range from the N-value image buffer 302. Further, the N-value image motion search unit 303 reads N-value image data of the block to be processed from the N-value image generation unit 301.

Furthermore, the N-value image motion search unit 303 performs block matching between the read N-value image data of the block to be processed and the N-value image reference data. More specifically, the N-value image motion search unit 303 performs matching while sequentially shifting the N-value image data of the block to be processed relative to the N-value image reference data within the search range. In other words, the N-value image motion search unit 303 compares the image data of a first area among the search range of the motion vector with the image data of the block to be processed and compares a second area among the search range of the motion vector with the image data of the block to be processed. The N-value image motion search unit 303 then outputs an N-value image search vector binMV based on the position of the area evaluated as most similar to the block to be processed among the search range.

According to the present exemplary embodiment, the N-value image is the binary image, so that a sum of exclusive OR (i.e., XOR SUM) between corresponding pixels is generally used as an index of a degree of similarity between N-value image blocks. An XOR SUM value in the binary image is similar to a sum of absolute difference (SAD, i.e., a value obtained by integrating absolute values of the differences between the pixels) in the multi-value image. For example, the pixel values (x pixels×y pixels) in the block to be processed in the N-value image are defined as Orgbin (0, 0), . . . , and Orgbin (x−1, y−1). Further, the pixel values (x pixels×y pixels) in the reference data of the N-value image which is a matching target are defined as Refbin (0, 0), . . . , and Refbin (x−1, y−1). In such a case, the XORSUM value is obtained using the following equation (1).

$$XORSUM = \sum_{i=0, j=0}^{x-1, y-1} (OrgbiN(i, j) XOR RefbiN(i, j)) \quad (1)$$

The XOR is true if input values are different, so that the degree of similarity becomes higher as the XORSUM value decreases and lower as the XORSUM value increases. According to the present exemplary embodiment, the XORSUM value is used as the degree of similarity. However, it is not limited thereto, and the SAD may be used for the N-value image.

According to the present exemplary embodiment, in step S702, the N-value image motion search unit 303 performs the motion search by executing a full search method in which block matching is performed on all candidate points within the search area. However, other search methods may be selected as appropriate according to a processing time or a circuit cost, therefore, it is not necessary to use the full search method.

In step S703, the reference vector calculation unit 304 calculates the PMV, i.e. the reference vector. In other words, the reference vector calculation unit 304 calculates the reference vector based on the motion vectors corresponding to the blocks other than the block to be processed.

In step S704, the selection unit 305 determines whether to employ the N-value image search vector or the reference vector as the motion vector of the block to be processed. The selection unit 305 makes the determination based on the motion search mode decided in the process of step S503 (i.e., refer to the flowchart illustrated in FIG. 6). As described above, the motion search mode of the block to be processed can be decided based on the quantization coefficient or the encoding type of the corresponding block. In other words, in step S704, the selection unit 305 determines whether to employ the reference vector as the motion vector of the block to be processed based on the encoding result (e.g., the quantization coefficient) of the frame previous to the frame to be processed.

In step S705, the inter-prediction error calculation unit 306 reads the reference image from the reference image buffer 106 based on the motion vector selected in step S704. The inter-prediction error calculation unit 306 then calculates the inter-prediction error between the reference image and the block to be processed in the original image. In other words, the inter-prediction error calculation unit 306 calculates the inter-prediction error (i.e., the difference data) according to the difference between the image data identified based on the motion vector employed in step S704 and the image data of the block to be processed. After completing the calculation of the inter-prediction error, the process of FIG. 7 ends, and the process proceeds to step S505 in the flowchart illustrated in FIG. 5.

In step S505, the encoding type determination unit 103 determines, based on the intra-prediction error, the inter prediction error, and the motion vector, whether the block to be processed is to be encoded employing intra-block encoding or inter-block encoding. According to the present exemplary embodiment, the encoding type determination unit 103 calculates the SAD of each of the intra-prediction error and the inter-prediction error. The encoding type determination unit 103 then adds a bit cost of the motion vector (i.e., the data amount of the motion vector) to the SAD of the inter-prediction error and determines the encoding type. However, the encoding type determination method is not limited to the above. For example, the encoding type may be determined using a rate-distortion (R-D) optimization method.

In step S506, the transformation-quantization unit 104 performs, based on the encoding type determined by the encoding type determination unit 103, orthogonal transformation and quantization on one of the intra-prediction error and the inter-prediction error and calculates the quantization coefficient. Further, inverse-quantization and inverse-transformation are performed on the calculated quantization coefficient and the result is stored as the reference image in the reference image buffer 106.

Furthermore, according to the present exemplary embodiment, the transformation-quantization unit 104 determines in step S506 whether the block to be processed satisfies the predetermined conditions for applying the skip block. If the transformation-quantization unit 104 determines that the predetermined conditions are satisfied, the skip block is applied. When the skip block is applied, the encoded data is output without the header information which includes the information indicating the encoding type and the motion vector of the block to be processed. According to the present exemplary embodiment, as the conditions for applying the skip block, the motion vector corresponding to the block to be processed, and the motion vectors corresponding to the blocks within the predetermined range from the block to be processed are aligned and that the residue after performing quantization is zero.

According to the present exemplary embodiment, whether to employ the reference vector as the motion vector of the block to be processed is determined using the encoding result of the corresponding block in the frame that is one frame prior to the frame to be processed. As a result, if the object greatly moves between adjacent frames, the accuracy of the reference vector may be lowered. If the object greatly moves as described above and the inter-prediction error becomes large, it becomes likely that the encoding type determination unit 103 selects the intra-block, so that accumulation of image deterioration due to continuation of the inter-block can be refreshed.

In step S507, the variable-length encoding unit 107 variable-length encodes the quantization coefficient and the various coding parameters, and generates the H.264-encoded stream. In the present exemplary embodiment, the H.264-encoded stream is generated as an example. However, it is not limited thereto, and the HEVC-encoded stream may also be generated.

In step S508, the image processing apparatus determines whether all blocks in the frame to be processed have been encoded. If the image processing apparatus determines that all blocks have been encoded (YES in step S508), the process ends. If the image processing apparatus determines that not all blocks have been encoded (NO in step S508), the process returns to step S501 and the subsequent blocks are processed. Further, if the image processing apparatus determines that all the frames to be processed have been encoded, the image processing apparatus determines whether the other frames included in the moving image have been encoded. If the image processing apparatus determines that the other frames have not been encoded, the image processing apparatus encodes the subsequent frame according to the process illustrated in FIG. 5.

As described above, according to the present exemplary embodiment, the image processing apparatus determines whether to employ the reference vector as the motion vector of the block to be processed in the second frame subsequent to the first frame constituting the moving image. The image processing apparatus makes the determination based on the encoding result (e.g., the quantization coefficients) of the first frame. As a result, it becomes easier for the motion vectors to be aligned in a situation where it is likely that the directions of the motion vectors are dispersed when performing the moving vector search with respect to the N-value image. The number of blocks to which the skip block can be applied thus increases.

According to the present exemplary embodiment, the motion search is performed using the N-value image. However, it is not limited thereto. If the motion search accuracy cannot be sufficiently maintained in the flat area or in the image including a large amount of noise, the reference vector may be employed instead of the motion vector based on the motion search. The encoding efficiency can thus be improved similar to the N-value image motion search.

A second exemplary embodiment according to the present exemplary embodiment will be described below by mainly focusing on the difference from the first exemplary embodiment. FIG. 1 illustrates the image processing apparatus (i.e., the encoding apparatus) according to the present exemplary embodiment similar to the first exemplary embodiment. According to the present exemplary embodiment, the operation of the inter-prediction unit 101 is different from the first exemplary embodiment.

Figure 8:
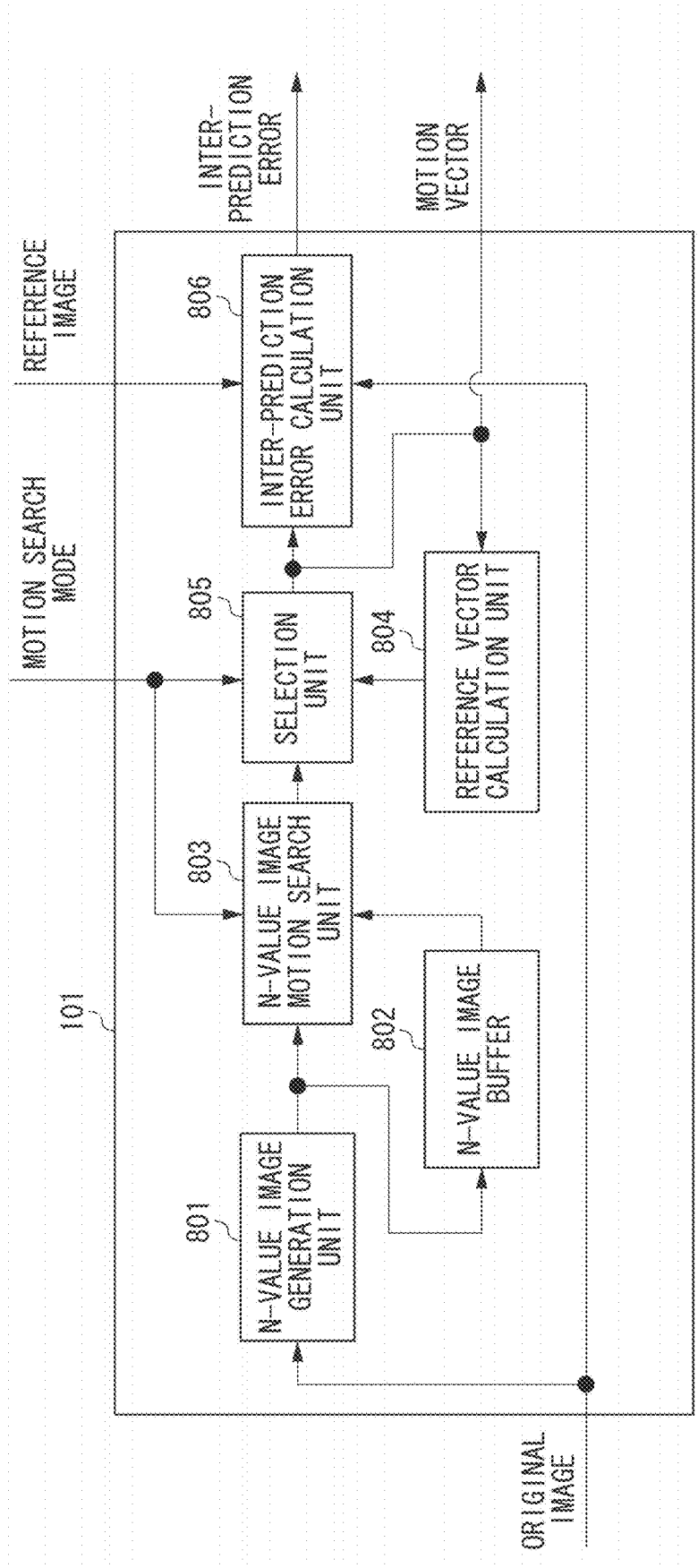
FIG. 8 a block diagram illustrating a configuration example of an image processing apparatus according to another exemplary embodiment of the present invention.

The configuration of the inter-prediction unit 101 according to the present exemplary embodiment will be described below with reference to FIG. 8. The operations of an N-value image generation unit 801, an N-value image buffer 802, a reference vector calculation unit 804, a selection unit 805, and an inter-prediction error calculation unit 806 are similar to those of the N-value image generation unit 301, the N-value image buffer 302, the reference vector calculation unit 304, the selection unit 305, and the inter-prediction error calculation unit 306 illustrated in FIG. 3.

An N-value image motion search unit 803 is capable of performing motion search based on block-matching processing using the N-value image. The N-value image motion search unit 803 is capable of outputting the N-value image search vector, i.e., the motion vector calculated by performing the motion search using the N-value image. The difference between the N-value image motion search unit 803 according to the present exemplary embodiment and the N-value image motion search unit 303 according to the first exemplary embodiment is that the motion search mode is input to the N-value image motion search unit 803.

According to the present exemplary embodiment, the motion search mode with respect to the block to be processed is input to the N-value image motion search unit 803 before the motion vector search is performed on the block to be processed using the N-value image. The motion search mode indicates whether to employ the reference vector as the motion vector of the block to be processed.

The N-value image motion search unit 803 then determines, based on the obtained motion search mode, whether it is necessary to perform the motion vector search of the block to be processed using the N-value image. If the N-value image motion search unit 803 determines that it is not necessary, the N-value image motion search unit 803 does not perform the motion vector search using the N-value image. As a result, a processing load and power consumption with respect to encoding can be reduced.

Figure 9:
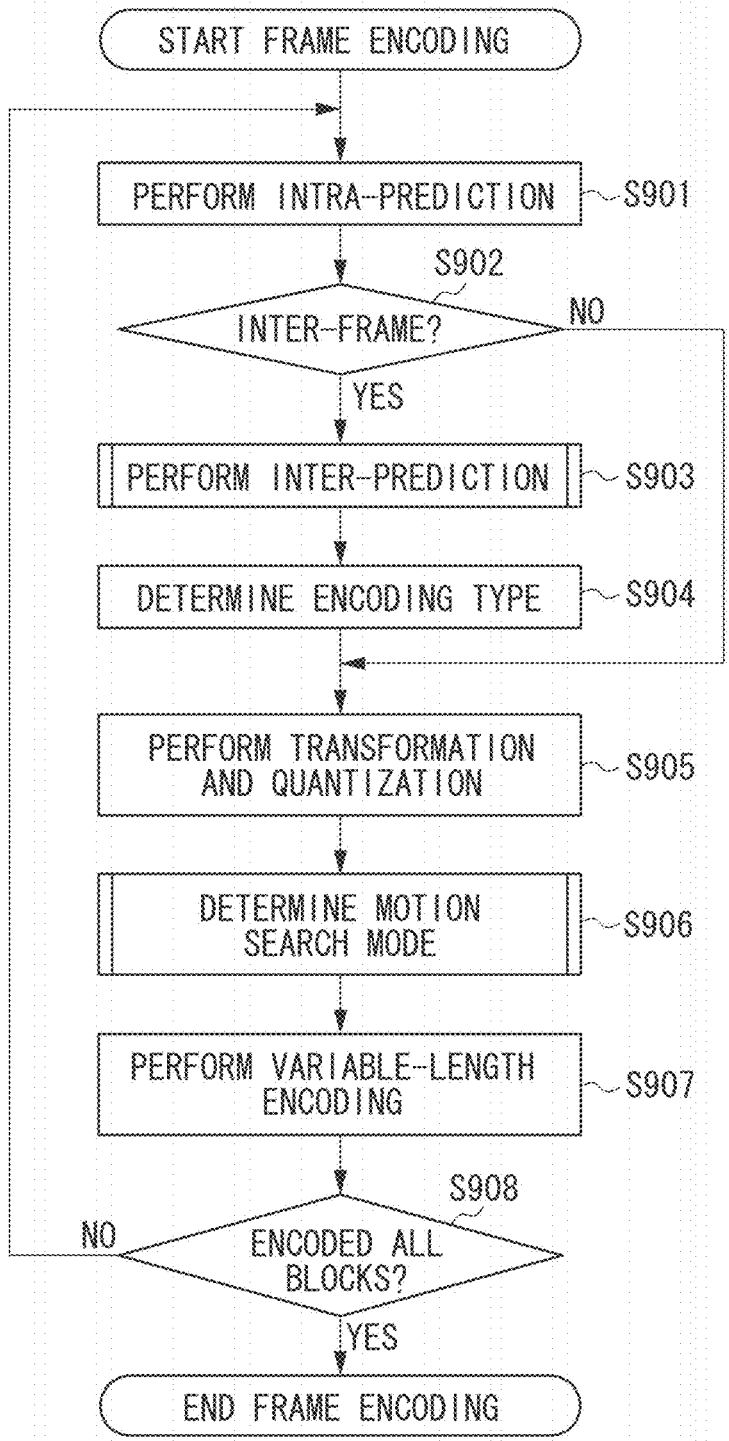
FIG. 9 is a flowchart illustrating a process performed by the image processing apparatus according to the exemplary embodiment.

The process performed according to the present exemplary embodiment will be described below with reference to the flowchart illustrated in FIG. 9. The process of the flowchart illustrated in FIG. 9 is realized by the CPU in the image processing apparatus reading from the memory and executing the program for performing the process of FIG. 9. Further, if the image processing apparatus according to the present exemplary embodiment is embedded in the network camera, the process illustrated in FIG. 9 is started along with the network camera starting image capturing. However, the image processing apparatus according to the present exemplary embodiment may be embedded in devices other than the network camera, such as the digital camera, the digital video camera, the personal computer, and the smartphone.

The processes performed in step S901, step S902, step S904, step S905, step S907, and step S908 correspond to step S501, step S502, step S505, step S506, step S507, and step S508 of the flowchart illustrated in FIG. 5 according to the first exemplary embodiment.

Figure 10:
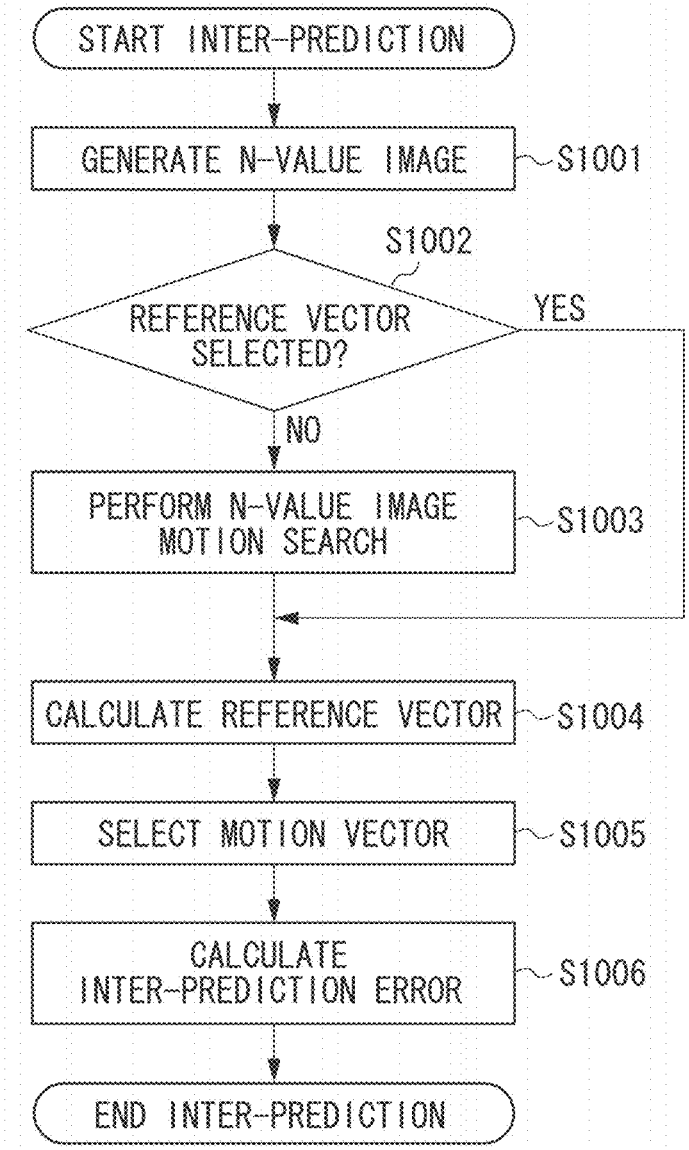
FIG. 10 is a flowchart illustrating the motion search mode determination process according to the exemplary embodiment.

In step S903, the inter-prediction unit 101 performs inter-prediction. The inter-prediction process according to the present exemplary embodiment will be described in detail below with reference to the flowchart illustrated in FIG. 10. The processes performed in step S1001 and step S1003 to step S1006 correspond to the processes performed in step S701 to step S705 of the flowchart illustrated in FIG. 7.

In step S1002, the N-value image motion search unit 803 determines whether the motion search mode corresponding to the block to be processed is the mode employing the reference vector. If the N-value image motion search unit 803 determines that the motion search mode is not the mode employing the reference vector (NO in step S1002), the process proceeds to step S1003. If the N-value image motion search unit 803 determines that the motion search mode is the mode employing the reference vector (YES in step S1002), the process proceeds to step S1004. If the reference vector is to be employed, the N-value image search vector is not employed, so that the N-value image motion search unit 803 does not perform the motion vector search using the N-value image. As a result, the processing load and the power consumption with respect to encoding can be reduced.

In step S906 of the flowchart illustrated in FIG. 9, the motion search mode determination unit 105 determines the motion search mode of the corresponding block in the subsequent frame of the frame to be processed in which the block to be processed exists. According to the present exemplary embodiment, the corresponding block is the block among blocks in the subsequent frame of the frame to be processed which is at the same position as the block to be processed. In other words, timing for determining the motion search mode is different between the first and second exemplary embodiments.

Figure 11:
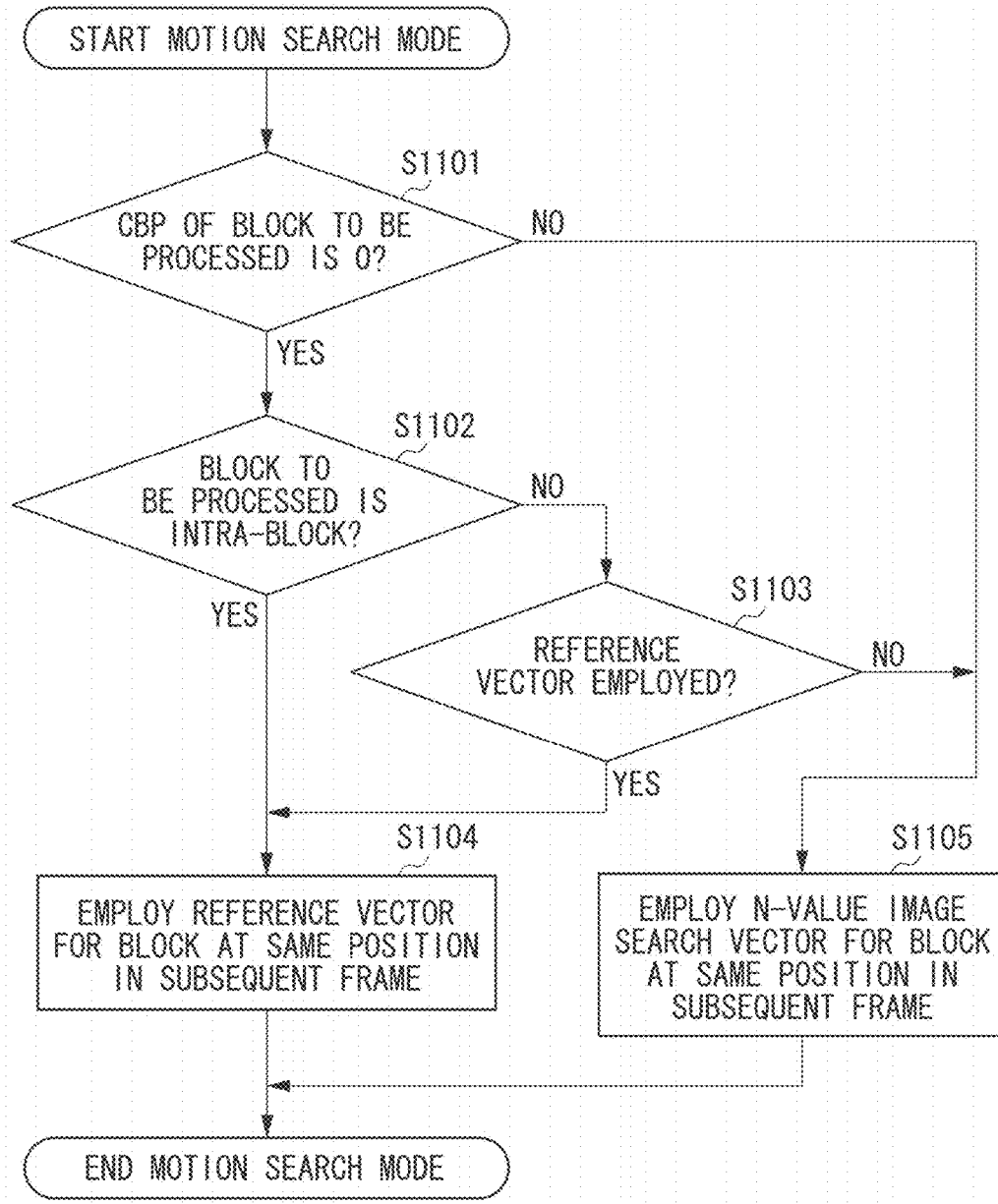
FIG. 11 is a flowchart illustrating the inter-prediction process according to the exemplary embodiment.

The process performed in step S906 will be described in detail below with reference to FIG. 11. In step S1101, the motion search mode determination unit 105 determines whether the CBP of the block to be processed is zero. If the motion search mode determination unit 105 determines that the CBP is zero (YES in step S1101), the process proceeds to step S1102. If the motion search mode determination unit 105 determines that the CBP is not zero (NO in step S1101), the process proceeds to step S1105.

In step S1102, the motion search mode determination unit 105 determines whether the block to be processed is the intra-block. If the motion search mode determination unit 105 determines that that the block to be processed is the intra-block (YES in step S1102), the process proceeds to step S1104. If the motion search mode determination unit 105 determines that that the block to be processed is the inter-block (NO in step S1102), the process proceeds to step S1103.

In step S1103, the motion search mode determination unit 105 determines whether the reference vector is employed as the motion vector of the block to be processed. If the motion search mode determination unit 105 determines that the reference vector is employed (YES in step S1103), the process proceeds to step S1104. If the motion search mode determination unit 105 determines that the reference vector is not employed (NO in step S1103), the process proceeds to step S1105.

In step S1104, the motion search mode determination unit 105 determines the motion search mode so that the reference vector is employed as the motion vector of the block among the plurality of blocks in the subsequent frame of the frame to be processed at the same position as (i.e., corresponding block of) the block to be processed. In step S1105, the motion search mode determination unit 105 determines the motion search mode so that the N-value image search vector is employed as the motion vector of the block among the plurality of blocks in the subsequent frame of the frame to be processed at the same position as (i.e., corresponding block of) the block to be processed. The N-value image search vector is the motion vector obtained by performing motion search on the image obtained by lowering the gradation of the input image.

As described above, according to the present exemplary embodiment, the motion search mode determination unit 105 determines, before starting the motion vector search using the N-value image of the block to be processed, whether to employ the reference vector as the motion vector of the block to be processed. If the motion search mode determination unit 105 determines that the reference vector is to be employed, the motion vector search using the N-value image is not executed. By such a configuration, the processing load and the power consumption for performing encoding can be reduced. According to the present exemplary embodiment, the image processing apparatus is capable of improving the encoding efficiency using the skip block. The image processing apparatus and the control method of the image processing apparatus are as described above.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-108552, filed May 26, 2014, which is hereby incorporated by reference herein in its entirety.

What is claimed is:

1. An image processing apparatus comprising:
   an encoding unit configured to encode frames of a moving image;
   a conversion unit configured to lower gradation of pixels of the frames;
   a search unit configured to search for a motion vector based on a correlation between a target block in a target frame of which the gradation has been lowered by the conversion unit, and each of a plurality of blocks in a frame different from the target frame of which the gradation has been lowered by the conversion unit, the target frame being subsequent to the first frame; and
   a determination unit configured to determine, based on an encoding result of the first frame by the encoding unit, whether to use a motion vector obtained by a search performed by the search unit or a predetermined vector as a motion vector for the target block.

2. The image processing apparatus according to claim 1, wherein the encoding unit generates encoded data not including data of the motion vector for the target block, according to a difference between the motion vector for the target block based on a determination performed by the determination unit and a motion vector for a block within a predetermined range from the target block in the target frame.

3. The image processing apparatus according to claim 2, wherein header information of the encoded data includes information indicating an encoding type of the target block.

4. The image processing apparatus according to claim 1, wherein the encoding result is a quantization coefficient.

5. The image processing apparatus according to claim 1, wherein the predetermined vector is a zero vector.

6. The image processing apparatus according to claim 1, wherein it is determined whether to use the predetermined vector as the motion vector for the target block, and the predetermined vector is calculated based on a motion vector for a second block which is displayed above the target block, a motion vector for a third block which is displayed to the left of the target block, and a motion vector for a fourth block which is displayed to the upper right of the target block.

7. The image processing apparatus according to claim 1, wherein it is determined whether to use the predetermined vector as the motion vector for the target block and the predetermined vector is calculated based on movement of an object detected from a frame previous to the target frame.

8. An image processing apparatus comprising:
   an encoding unit configured to encode frames of a moving image;
   a search unit configured to search for a motion vector based on a plurality of blocks in a frame different from a target frame subsequent to a first frame and a target block in the target frame; and
   a determination unit configured to determine, based on an encoding result of the first frame by the encoding unit, whether to use a motion vector obtained by a search performed by the search unit or a predetermined vector as a motion vector for the target block,
   wherein the determination unit determines to use the predetermined vector as the motion vector for the target block, in a case where a quantization coefficient of a corresponding block, in the first frame, of which a position corresponds to the target block, satisfies the predetermined conditions, and intra-encoding is performed on the corresponding block.

9. The image processing apparatus according to claim 1, wherein the determination unit determines, based on the encoding result of the first frame, whether to use the predetermined vector as the motion vector for the target block, previous to starting encoding of the target frame, and
   wherein, the search unit does not perform the search for the target block, in a case where the determination unit determines to use the predetermined vector as the motion vector for the target block.

10. A control method of an image processing apparatus comprising:
    encoding frames of a moving image;
    lowering gradation of pixels of the frames;
    searching for a motion vector based on a correlation between a target block in a target frame of which the gradation has been lowered, and each of a plurality of blocks in a frame different from the target frame of which the gradation has been lowered, the target frame being subsequent to the first frame; and
    determining, based on an encoding result of the first frame, whether to use a motion vector obtained by a search performed or a predetermined vector as a motion vector for the target block.

11. The control method according to claim 10, wherein it is determined whether to use the predetermined vector as the motion vector for the target block, and the predetermined vector is calculated based on a motion vector for a second block which is displayed above the target block, a motion vector for a third block which is displayed to the left of the target block, and a motion vector for a fourth block which is displayed to the upper right of the target block.

12. A non-transitory computer-readable medium storing a program for causing a computer to execute a method comprising:

encoding frames of a moving image;
lowering gradation of pixels of the frames;
searching for a motion vector based on a correlation between a target block in a target frame of which the gradation has been lowered, and each of a plurality of blocks in a frame different from the target frame of which the gradation has been lowered, the target frame being subsequent to the first frame; and
determining, based on an encoding result of the first frame, whether to use a motion vector obtained by a search performed or a predetermined vector as a motion vector for the target block.

13. The non-transitory medium according to claim 12, wherein it is determined whether to use the predetermined vector as the motion vector for the target block, and the predetermined vector is calculated based on a motion vector for a second block which is displayed above the target block, a motion vector for a third block which is displayed to the left of the target block, and a motion vector for a fourth block which is displayed to the upper right of the target block.

14. An image processing apparatus comprising:
an encoding unit configured to encode frames of a moving image;
a search unit configured to search for a motion vector based on a plurality of blocks in a frame different from a target frame subsequent to a first frame and a target block in the target frame; and
a determination unit configured to determine, based on an encoding result of the first frame by the encoding unit, whether to use a motion vector obtained by a search performed by the search unit or a predetermined vector as a motion vector for the target block,
wherein the determination unit determines whether to use the motion vector obtained by the search or the predetermined vector as the motion vector for the target block, in accordance with whether a motion vector for a corresponding block, in the first frame, of which a position corresponds to the target block, is the predetermined vector or not.

15. The image processing apparatus according to claim 8, wherein the predetermined vector is a zero vector.

16. The image processing apparatus according to claim 8, wherein the determination unit determines, based on the encoding result of the first frame, whether to use the predetermined vector as the motion vector for the target block, previous to starting encoding of the target frame, and
wherein, the search unit does not perform the search for the target block, in a case where the determination unit determines to use the predetermined vector as the motion vector for the target block.

17. The image processing apparatus according to claim 14, wherein the predetermined vector is a zero vector.

18. The image processing apparatus according to claim 14, wherein the determination unit determines, based on the encoding result of the first frame, whether to use the predetermined vector as the motion vector for the target block, previous to starting encoding of the target frame, and
wherein the search unit does not perform the search for the target block, in a case where the determination unit determines to use the predetermined vector as the motion vector for the target block.

19. The image processing apparatus according to claim 14, wherein the determination unit determines whether to use the motion vector obtained by the search or the predetermined vector as the motion vector for the target block, in accordance with whether the motion vector for the corresponding block is the predetermined vector or not, in a case where a quantization coefficient of the corresponding block satisfies a predetermined conditions and inter-coding is to be performed on the corresponding block.

20. An image processing method comprising:
encoding frames of a moving image;
searching for a motion vector based on a plurality of blocks in a frame different from a target frame subsequent to a first frame and a target block in the target frame;
determining, based on an encoding result of the first frame, whether to use a motion vector obtained by a search performed or a predetermined vector as a motion vector for the target block; and
determining to use the predetermined vector as the motion vector for the target block, in a case where a quantization coefficient of a corresponding block, in the first frame, of which a position corresponds to the target block, satisfies the predetermined conditions, and intra-encoding is performed on the corresponding block.

21. A non-transitory computer-readable medium storing a program for causing a computer to execute a method comprising:
encoding frames of a moving image;
searching for a motion vector based on a plurality of blocks in a frame different from a target frame subsequent to a first frame and a target block in the target frame;
determining, based on an encoding result of the first frame, whether to use a motion vector obtained by a search performed or a predetermined vector as a motion vector for the target block; and
determining to use the predetermined vector as the motion vector for the target block, in a case where a quantization coefficient of a corresponding block, in the first frame, of which a position corresponds to the target block, satisfies the predetermined conditions, and intra-encoding is performed on the corresponding block.

22. An image processing method comprising:
encoding frames of a moving image;
searching for a motion vector based on a plurality of blocks in a frame different from a target frame subsequent to a first frame and a target block in the target frame;
determining, based on an encoding result of the first frame, whether to use a motion vector obtained by a search performed or a predetermined vector as a motion vector for the target block; and
determining whether to use the motion vector obtained by the search or the predetermined vector as the motion vector for the target block, in accordance with whether a motion vector for a corresponding block, in the first frame, of which a position corresponds to the target block, is the predetermined vector or not.

23. A non-transitory computer-readable medium storing a program for causing a computer to execute a method comprising:
encoding frames of a moving image;
searching for a motion vector based on a plurality of blocks in a frame different from a target frame subsequent to a first frame and a target block in the target frame;
determining, based on an encoding result of the first frame, whether to use a motion vector obtained by a search performed or a predetermined vector as a motion vector for the target block; and determining whether to use the motion vector obtained by the search or the predetermined vector as the motion vector for the target block, in accordance with whether a motion vector for a corresponding block, in the first frame, of which a position corresponds to the target block, is the predetermined vector or not.

* * * * *